United States Patent [19]
Healy et al.

[11] Patent Number: 5,625,953
[45] Date of Patent: May 6, 1997

[54] CLAMPING DEVICE FOR VEHICLE WHEEL ALIGNMENT EQUIPMENT

[76] Inventors: Donald A. Healy, 457 Highway 286 East; James L. Dale, Jr., 9 Ridgewood, both of Conway, Ark. 72032

[21] Appl. No.: 348,708

[22] Filed: Dec. 2, 1994

[51] Int. Cl.⁶ .......................... G01B 5/255; G01B 11/275
[52] U.S. Cl. .............. 33/203.18; 33/288; 33/336; 248/205.1
[58] Field of Search .................. 72/705, 479, 704, 72/458; 33/203, 203.12, 203.18, 203.19, 288, 336, 600; 248/205.1

[56] References Cited

U.S. PATENT DOCUMENTS

| | | | |
|---|---|---|---|
| 3,426,991 | 2/1969 | Rishovd | 248/205.1 |
| 4,285,136 | 8/1981 | Ragan | 33/203.18 |
| 4,432,145 | 2/1984 | Caroff | 33/203.18 |
| 4,453,315 | 6/1984 | Mosiman et al. | 33/203.18 |
| 4,953,307 | 9/1990 | Loucas | 33/203 |
| 5,339,508 | 8/1994 | Ventress | 33/203.18 |

*Primary Examiner*—Christopher W. Fulton
*Attorney, Agent, or Firm*—Niro, Scavone, Haller & Niro

[57] ABSTRACT

A clamping device for mounting an alignment head to the hub of a vehicle which comprises a frame; a shaft upon which the head is mountable connected to the frame; a first clamping member connected to the frame and comprising a first groove for engaging at least a first bolt of the hub; and a second clamping member movably connected to the frame and comprising a second groove for engaging at least a second bolt of the hub.

2 Claims, 3 Drawing Sheets

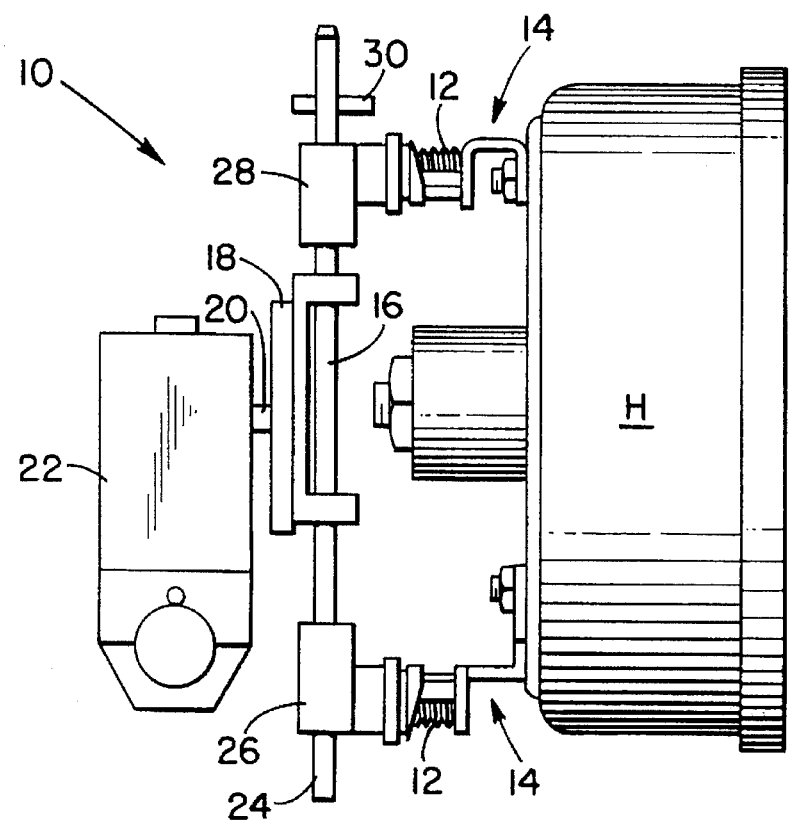
FIG_1
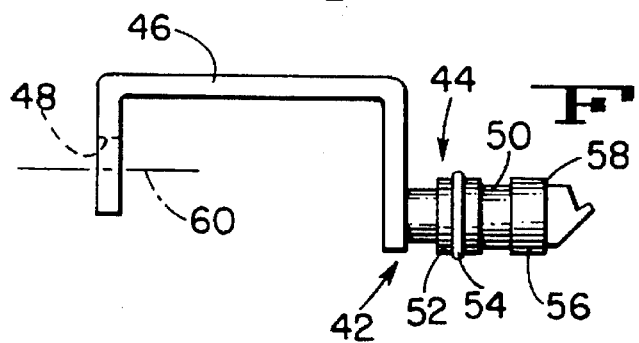
FIG_2
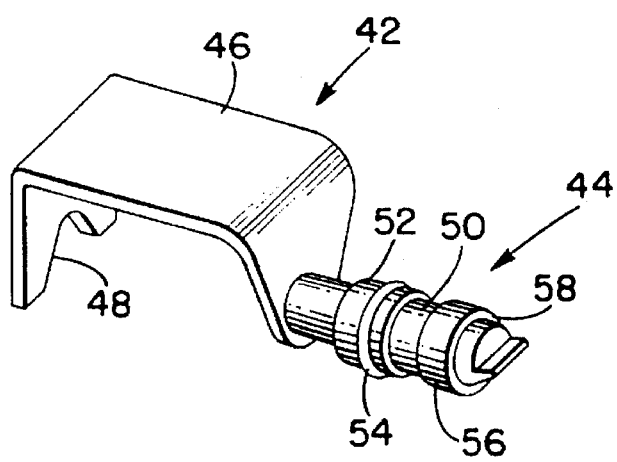
FIG_3

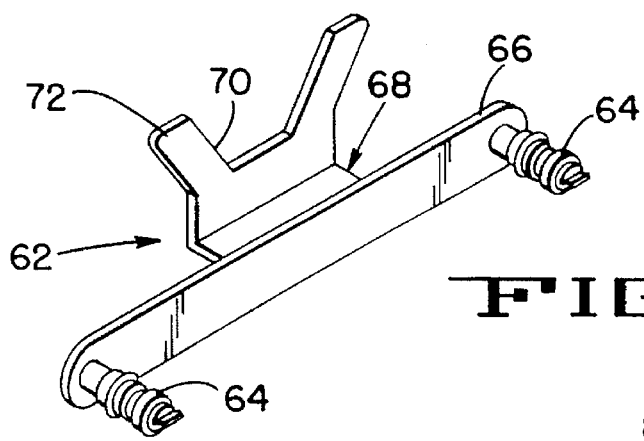
FIG_4
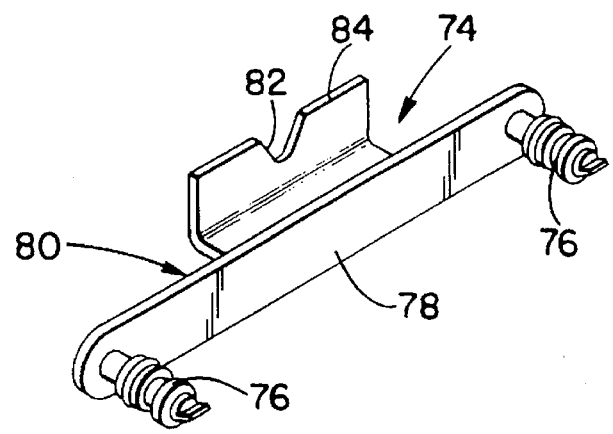
FIG_5
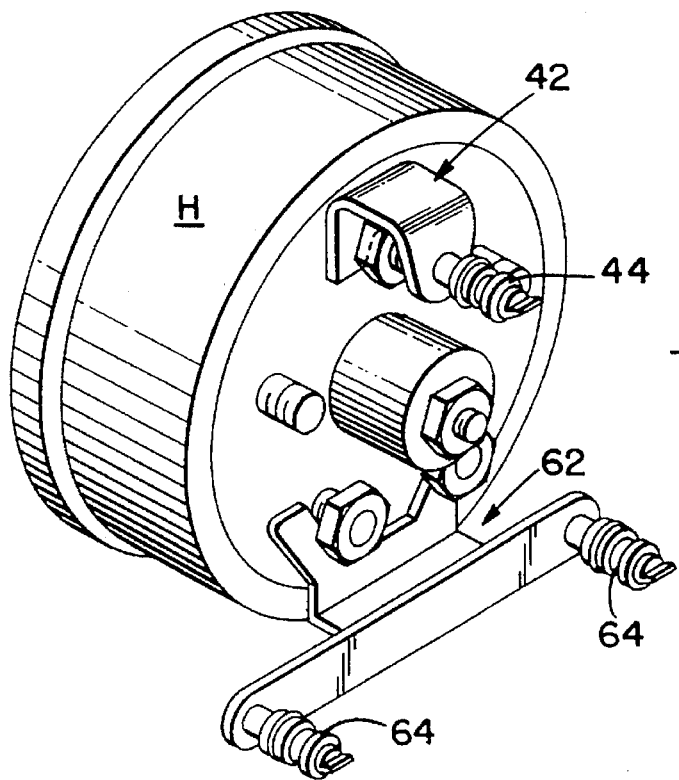
FIG_6

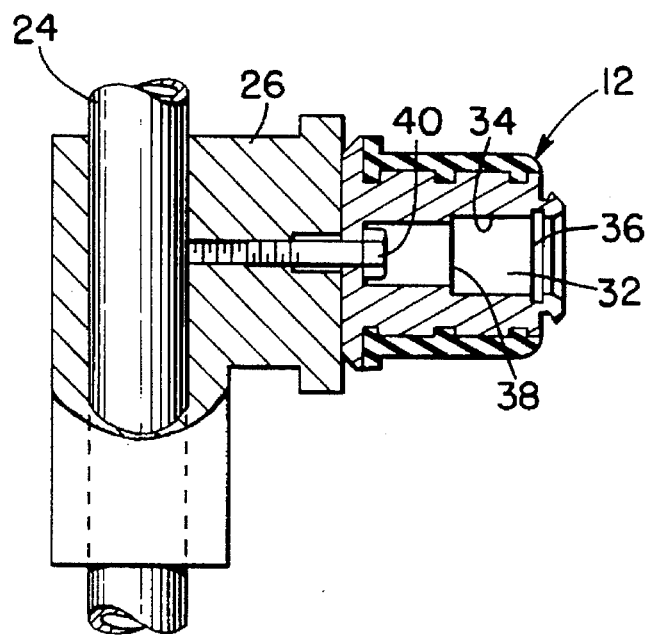
FIG_7
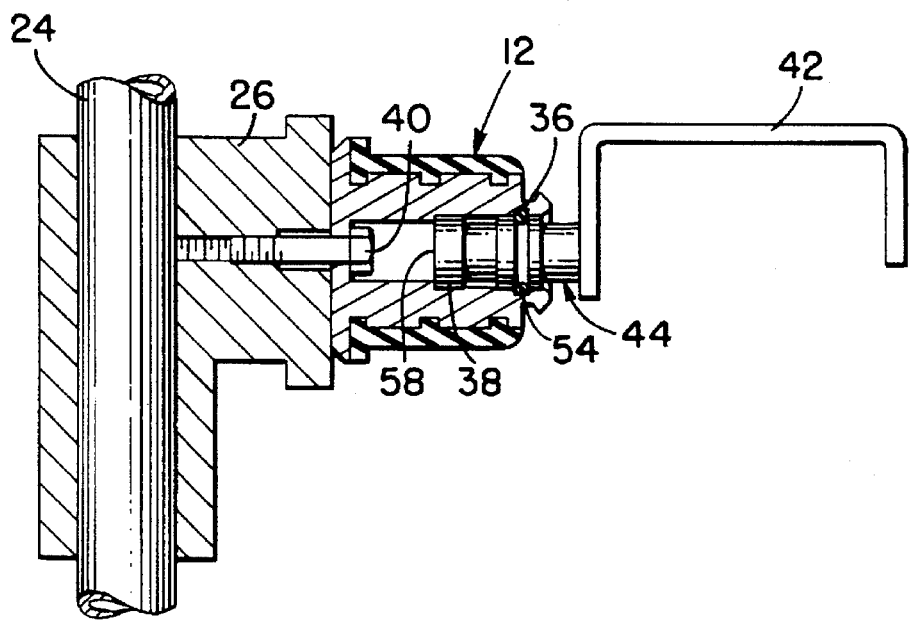
FIG_8

CLAMPING DEVICE FOR VEHICLE WHEEL ALIGNMENT EQUIPMENT

BACKGROUND OF THE INVENTION

1. Field of the Invention

The present invention relates to a vehicle wheel aligner comprising a number of heads having angle measuring instruments for measuring the alignment characteristics of a vehicle. More particularly, the invention relates to a clamping device for mounting the heads to a vehicle which has had its wheels removed.

2. Description of Related Art

Vehicle wheel aligners are well known in the art. Such aligners typically comprise a number of alignment heads which are mountable relative to the wheels of a vehicle and include angle measuring instruments for measuring the alignment characteristics of the vehicle. The heads are typically mounted to the rims of the wheels using wheel clamps. Examples of such wheel clamps can be found in U.S. Pat. No. 5,242,202 issued to Ettinger; U.S. Pat. No. 4,815,216 issued to Swayne; and U.S. Pat. No. 4,285,136 issued to Ragan, all of which are owned by the assignee hereof.

Often it is desired to measure certain alignment characteristics of a vehicle with the wheels removed. Prior art wheel clamps which are designed to engage the rims of a wheel are not useful in these circumstances. Instead, flange plates have been used to mount the heads directly to the hubs of the vehicle. These flange plates typically include a transverse shaft on which the head is mounted and a number of holes corresponding to the bolts on the hub. However, since a wide range of hub sizes and bolt patterns exist among the many different models of vehicles, a large inventory of flange plates is usually required.

SUMMARY OF THE INVENTION

Therefore, it is an object of the present invention to provide a device for mounting an alignment head to the hub of a vehicle. It is a further object of the invention to provide such a device which comprises a minimum number of parts but which can be used with a wide range of hub sizes and bolt patterns.

According to the present invention, these and other objects and advantages are achieved by providing a clamping device which comprises a number of spaced-apart sockets for receiving two or more bolt-engaging grabbers. The sockets are preferably supported on upper and lower brackets which are connected by two parallel posts. The lower bracket is preferably fixed to the posts while the upper bracket is slidable relative to the posts so that the spacing between the sockets can be varied. A head carrier comprising a transverse shaft upon which the head is rotatably supported is slidably connected to the posts between the upper and lower brackets. In this manner, the position of the head relative to the sockets can be varied.

The grabbers each comprise a groove for engaging one or more bolts on the hub and a plug for removably attaching the grabber to a socket. In a preferred embodiment of the invention, the clamping device comprises an upper bracket having a single, centrally-located socket and an upper grabber which includes a groove designed to engage a single bolt and a plug for removably attaching the grabber to the socket. The clamping device also comprises a lower bracket having two spaced-apart sockets and a first lower grabber which includes a wide groove for engaging two bolts and two spaced-apart plugs for removably attaching the grabber to the sockets. The clamping device preferably also comprises a second lower grabber having a groove for engaging a single bolt, the second lower grabber being interchangeable with the first lower grabber when a particular bolt pattern presents only a single bolt for the lower grabber to engage. Thus, the clamping device of the present invention can be used to mount the heads of a vehicle wheel aligner to hubs having a variety of sizes and bolt patterns.

These and other objects and advantages of the present invention will be made apparent from the following detailed description, with reference to the accompanying drawings.

BRIEF DESCRIPTION OF THE DRAWINGS

FIG. 1 is a side elevation of the clamping device of the present invention shown attached to a vehicle hub and having an alignment head mounted thereon;

FIG. 2 is a side elevation of one embodiment of a grabber element of the present invention;

FIG. 3 is a perspective view of the grabber element depicted in FIG. 2;

FIG. 4 is a perspective view of a second embodiment of the grabber element of the present invention;

FIG. 5 is a perspective view of yet another embodiment of the grabber element of the present invention;

FIG. 6 is a perspective view of a vehicle hub showing the grabbers depicted in FIGS. 3 and 4 attached thereto;

FIG. 7 is a cross-sectional view of the socket portion of the clamping device of the present invention; and FIG. 8 is a cross-sectional view of the socket portion of the clamping device depicted in FIG. 7 showing the engagement of the plug portion of the grabbers with the socket.

DETAILED DESCRIPTION OF THE PREFERRED EMBODIMENTS

Referring to FIG. 1, the clamping device of the present invention, referred to generally by reference number 10, is shown mounted to a hub H of a vehicle. Clamping device 10 comprises a number of spaced-apart sockets 12 for receiving bolt-engaging grabbers 14, which engage the bolts of hub H to thereby attach clamping device 10 to hub H. Sockets 12 are connected together by a frame member 16, which also support a head carrier member 18 having a transverse shaft 20 upon which an alignment head 22 maybe rotatably supported in a manner known to those skilled in the art.

In a preferred embodiment of the invention, the components of clamping device 10 exclusive of the grabbers 14 may be adapted from a standard wheel clamp, such as is disclosed in any of the above-mentioned patents. In this embodiment, frame member 16 comprises preferably two parallel posts 24, and clamping device 10 includes a lower bracket 26 secured to posts 24 and an upper bracket 28 slidably connected to posts 24. As explained more fully in the Ragan patent, upper bracket 28 includes a clamping knob 30 by which the upper bracket may be selectively locked into position relative to posts 24. In addition, head carrier 18 is slidably connected to posts 24 and may be raised and lowered and locked into position on posts 24 by suitable means, such as those described in the Ragan patent.

Referring still to FIG. 1, sockets 12 are shown connected to lower and upper brackets 26, 28. While the present invention contemplates that the number and spacing of sockets 12 on lower and upper brackets 26, 28 can vary, the total number of spaced-apart sockets should be at least two. In the preferred embodiment of the invention, lower bracket 26 comprises two spaced-apart sockets 12 and upper bracket 28 comprises a single, centrally located socket 12. Referring to FIG. 7, each socket 12 comprises a central bore 32 forming an inner wall 34. For purposes to be described hereafter, a retention groove 36 and a locating collar 38 are formed in the inner wall 34 of socket 12. Socket 12 is preferably mounted to a corresponding bracket 26 or 28 by a bolt 40 passing through a hole in the base of socket 12.

Referring to FIGS. 2 and 3, one embodiment of a grabber 14 of the present invention, which shall be referred to for convenience as an upper grabber 42, is shown to comprise a plug member 44 connected to a generally "U"-shaped clamp 46 having a generally "V"-shaped bolt-engaging groove 48 formed in the portion of clamp 46 which is spaced apart from plug 44. Plug 44 preferably comprises a shaft 50, a first raised-diameter section 52 on which a resilient "O"-ring 54 is mounted, and a second raised-diameter section 56 forming a locating shoulder 58. The diameter of raised-diameter sections 52, 56 corresponds to the diameter of inner wall 34 of socket 12. Referring to FIG. 8, upper grabber 42 is removably attached to socket 12 by inserting plug 44 into bore 32, whereupon locating shoulder 58 will engage locating collar 38 and "O"-ring 54 will expand into retention groove 36 to thereby firmly maintain the engagement between socket 12 and plug 44. Of course, upper grabber 42 may alternatively be permanently connected to socket 12 by welding or any other suitable means.

Referring again to FIGS. 2 and 3, groove 48 of upper grabber 42 is designed to engage a single bolt on hub H and is tapered to accommodate bolts of varying sizes. In addition, the axis 60 of groove 48 is preferably offset from the longitudinal centerline of plug 44 to provide increased stability when clamping device 10 is secured to the bolts of hub H.

Referring to FIG. 4, another embodiment of a grabber 14 of the present invention, which shall be referred to for convenience as lower grabber 62, is shown to comprise preferably two plugs 64 connected to opposite ends of an elongated support member 66 of a clamp 68. Plugs 64 are similar to plugs 44, thus making a separate description thereof unnecessary. Clamp 68 comprises an enlarged, generally trough-shaped groove 70 formed by a transverse, generally "Y"-shaped member 72 attached to support member 66. Lower grabber 62 is preferably connected to lower or upper brackets 26, 28 by inserting plugs 64 into corresponding sockets 12, in a manner similar to that described with reference to upper grabber 42. In addition, groove 70 of lower grabber 62 is designed to engage two bolts of hub H, the taper in groove 70 serving to accommodate different spacings between the two bolts.

Referring to FIG. 5, another embodiment of a grabber 14 of the present invention, which shall be referred to for convenience as lower grabber 74, is shown to comprise two plugs 76 similar to plugs 64 and 44 connected to opposite ends of an elongated support member 78 of a clamp 80. Clamp 80 comprises a generally "V"-shaped groove 82 formed in a transverse upstanding member 84 attached to support member 78. Lower grabber 74 is preferably connected to lower or upper brackets 26, 28 by inserting plugs 76 into corresponding sockets 12, in a manner similar to that described with reference to upper grabber 42. In addition, groove 82 is designed to engage a single bolt on hub H and is tapered to accommodate bolts of varying sizes.

In the preferred embodiment of the invention, upper bracket 28 comprises a single, centrally-located socket 12 and upper grabber 42 is connected to upper bracket 28 via the single socket 12. In addition, lower bracket 26 comprises two sockets 12 and either lower grabber 62 or lower grabber 74 is connected lower bracket 26 via the two sockets 12. Thus, the distance between plugs 64, 76 on the respective lower grabbers 62, 74 corresponds to the distance between the two sockets on lower bracket 26.

Referring to FIG. 6, the grabber members of the present invention are shown attached to a hub H having a particular pattern of bolts. Upper grabber 42 is shown connected to a single bolt and lower grabber 62 is shown connected to the two bolts opposite the single bolt. Grabbers 42, 62 are preferably secured to the bolts using the available nuts. If a particular bolt pattern presents a single bolt opposite the single bolt to which upper grabber 42 is attached, then lower grabber 74 would appropriately be used instead of lower grabber 62. In practice, upper grabber 42 is connected to a single bolt on hub H and the appropriate lower grabber is connected to the opposite bolt or bolts. The remainder of clamping device 10 is then connected to the grabbers by positioning sockets 12 over the corresponding plugs. Since upper bracket 28 is slidable on posts 24, the spacing between sockets 12 on lower and upper brackets 26, 28 may be varied so that sockets 12 may be properly positioned over the corresponding plugs. In addition, since head carrier 18 is slidably mounted on posts 24, head 22 may be raised or lowered with respect to hub H, if necessary.

Thus, the present invention contemplates a clamping device for mounting an alignment head to a vehicle hub. In addition, the clamping device comprises a relatively small number of parts which are adaptable to fit a wide range of hub sizes and bolt patterns.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A device for removably attaching an alignment head to a hub of a vehicle having a plurality of bolts, the device comprising: a frame member;

a head carrier member connected to the frame member;

a shaft connected transverse to the head carrier member, the alignment head being mountable on the shaft;

a first bracket connected to the frame member, the first bracket including at least one socket;

a second bracket movably connected to the frame member, the second bracket including at least one socket;

a first bolt engaging member associated with the first bracket, the first bolt engaging member including a clamp, at least one plug connected to the clamp and receivable in a corresponding socket of the first bracket, and a groove formed in the clamp for engaging at least a first bolt of the hub;

a second bolt engaging member associated with the second bracket, the second bolt engaging member including a clamp, at least one plug connected to the clamp and receivable in a corresponding socket of the second bracket, and a groove formed in the clamp for engaging at least a second bolt of the hub;

wherein the first and second bolt engaging members are removably connectable with the first and second brackets and the grooves of the first and second bolt engaging members can be positioned to engage the first and second bolts to secure the frame to the hub.

2. The device of claim 1, wherein the frame member comprises two spaced apart, generally parallel posts, wherein the head carrier member and the first bracket are connected to the posts and wherein the second bracket is movably connected to the posts.

* * * * *

UNITED STATES PATENT AND TRADEMARK OFFICE
CERTIFICATE OF CORRECTION

PATENT NO. : 5,625,953

DATED : May 6, 1997

INVENTOR(S) : Donald A. Healy and James L. Dale, Jr.

It is certified that error appears in the above-indentified patent and that said Letters Patent is hereby corrected as shown below:

On the Title Page, Item 73, Assignee should read --"Snap-on Technologies, Inc., Lincolnshire, IL"--.

Signed and Sealed this

Twenty-eighth Day of October, 1997

*Attest:*

BRUCE LEHMAN

*Attesting Officer*      *Commissioner of Patents and Trademarks*